US010108303B2

United States Patent
Shepelev et al.

(10) Patent No.: US 10,108,303 B2
(45) Date of Patent: *Oct. 23, 2018

(54) COMBINING TRANS-CAPACITANCE DATA WITH ABSOLUTE-CAPACITANCE DATA FOR TOUCH FORCE ESTIMATES

(71) Applicant: SYNAPTICS INCORPORATED, San Jose, CA (US)

(72) Inventors: Petr Shepelev, Campbell, CA (US); Andrew Wingard, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/088,026

(22) Filed: Mar. 31, 2016

(65) Prior Publication Data

US 2017/0285797 A1 Oct. 5, 2017

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0412* (2013.01); *G06F 2203/04107* (2013.01)

(58) Field of Classification Search
CPC ...... G06F 3/044; G06F 3/0414; G06F 3/0412; G06F 3/0416; G06F 2203/04105; G06F 2203/04106; G06F 2203/04107
See application file for complete search history.

(56) References Cited

U.S. PATENT DOCUMENTS

| | | | |
|---|---|---|---|
| 5,510,813 | A | 4/1996 | Makinwa et al. |
| 5,942,733 | A | 8/1999 | Allen et al. |
| 5,943,044 | A | 8/1999 | Martinelli et al. |
| 6,002,389 | A | 12/1999 | Kasser |
| 7,154,481 | B2 | 12/2006 | Cross et al. |
| 7,215,329 | B2 | 5/2007 | Yoshikawa et al. |
| 7,395,717 | B2 | 7/2008 | DeAngelis et al. |
| 7,538,760 | B2 | 5/2009 | Hotelling et al. |
| 7,825,911 | B2 | 11/2010 | Sano et al. |
| 8,063,886 | B2 | 11/2011 | Serban et al. |
| 8,607,651 | B2 | 12/2013 | Eventoff |
| 8,627,716 | B2 | 1/2014 | Son |
| 8,686,952 | B2 | 4/2014 | Burrough et al. |
| 8,730,199 | B2 | 5/2014 | Sleeman et al. |
| 8,857,274 | B2 | 10/2014 | Mamigonians |
| 9,075,095 | B2 | 7/2015 | Kallassi et al. |
| 2004/0090429 | A1 | 5/2004 | Geaghan et al. |
| 2006/0260417 | A1 | 11/2006 | Son et al. |

(Continued)

OTHER PUBLICATIONS

PCT/US2017/019737, International Search Report and Writtten Opinion dated May 24, 2017, consists of 12 pages.

*Primary Examiner* — Latanya Bibbins
(74) *Attorney, Agent, or Firm* — Patterson + Sheridan, LLP

(57) ABSTRACT

Techniques for obtaining force-based data of an input device are provided. The techniques include driving sensor electrodes in transcapacitive mode and in absolute capacitive mode, obtaining profiles for each of the modes, scaling the transcapacitive profile, and subtracting the scaled transcapacitive profile from the profile for absolute capacitive sensing. The result of this subtraction is force-based data that indicates the degree of force with that input object applies to the input device.

20 Claims, 8 Drawing Sheets

(56) References Cited

U.S. PATENT DOCUMENTS

| | | |
|---|---|---|
| 2007/0229464 A1 | 10/2007 | Hotelling et al. |
| 2007/0236466 A1 | 10/2007 | Hotelling |
| 2008/0174321 A1 | 7/2008 | Kang et al. |
| 2009/0273573 A1 | 11/2009 | Hotelling |
| 2010/0242629 A1 | 9/2010 | Leuenberger et al. |
| 2010/0253651 A1 | 10/2010 | Day |
| 2010/0282000 A1 | 11/2010 | Gorjanc et al. |
| 2011/0096025 A1 | 4/2011 | Slobodin et al. |
| 2011/0141053 A1 | 6/2011 | Bulea et al. |
| 2011/0227872 A1 | 9/2011 | Huska et al. |
| 2011/0278078 A1 | 11/2011 | Schediwy et al. |
| 2012/0013573 A1 | 1/2012 | Liu et al. |
| 2012/0025876 A1 | 2/2012 | Kimura |
| 2012/0038583 A1 | 2/2012 | Westhues et al. |
| 2012/0062245 A1 | 3/2012 | Bao et al. |
| 2012/0098788 A1 | 4/2012 | Sekiguchi |
| 2012/0105367 A1 | 5/2012 | Son et al. |
| 2012/0139864 A1 | 6/2012 | Sleeman et al. |
| 2012/0299866 A1 | 11/2012 | Pao et al. |
| 2013/0047747 A1 | 2/2013 | Joung |
| 2013/0076646 A1 | 3/2013 | Krah et al. |
| 2013/0234977 A1 | 9/2013 | Lin et al. |
| 2014/0002114 A1 | 1/2014 | Schwartz et al. |
| 2014/0028575 A1 | 1/2014 | Parivar et al. |
| 2014/0085213 A1 | 3/2014 | Huppi et al. |
| 2014/0085247 A1 | 3/2014 | Leung et al. |
| 2014/0247239 A1 | 9/2014 | Jamshidi-Roudbari et al. |
| 2014/0267128 A1 | 9/2014 | Bulea et al. |
| 2014/0267152 A1 | 9/2014 | Curtis |
| 2014/0307186 A1 | 10/2014 | Yun et al. |
| 2015/0002447 A1 | 1/2015 | Schediwy |
| 2015/0015475 A1 | 1/2015 | Ely et al. |
| 2015/0084909 A1 | 3/2015 | Worfolk et al. |
| 2017/0285835 A1* | 10/2017 | Shepelev ............. G06F 3/0416 |

* cited by examiner

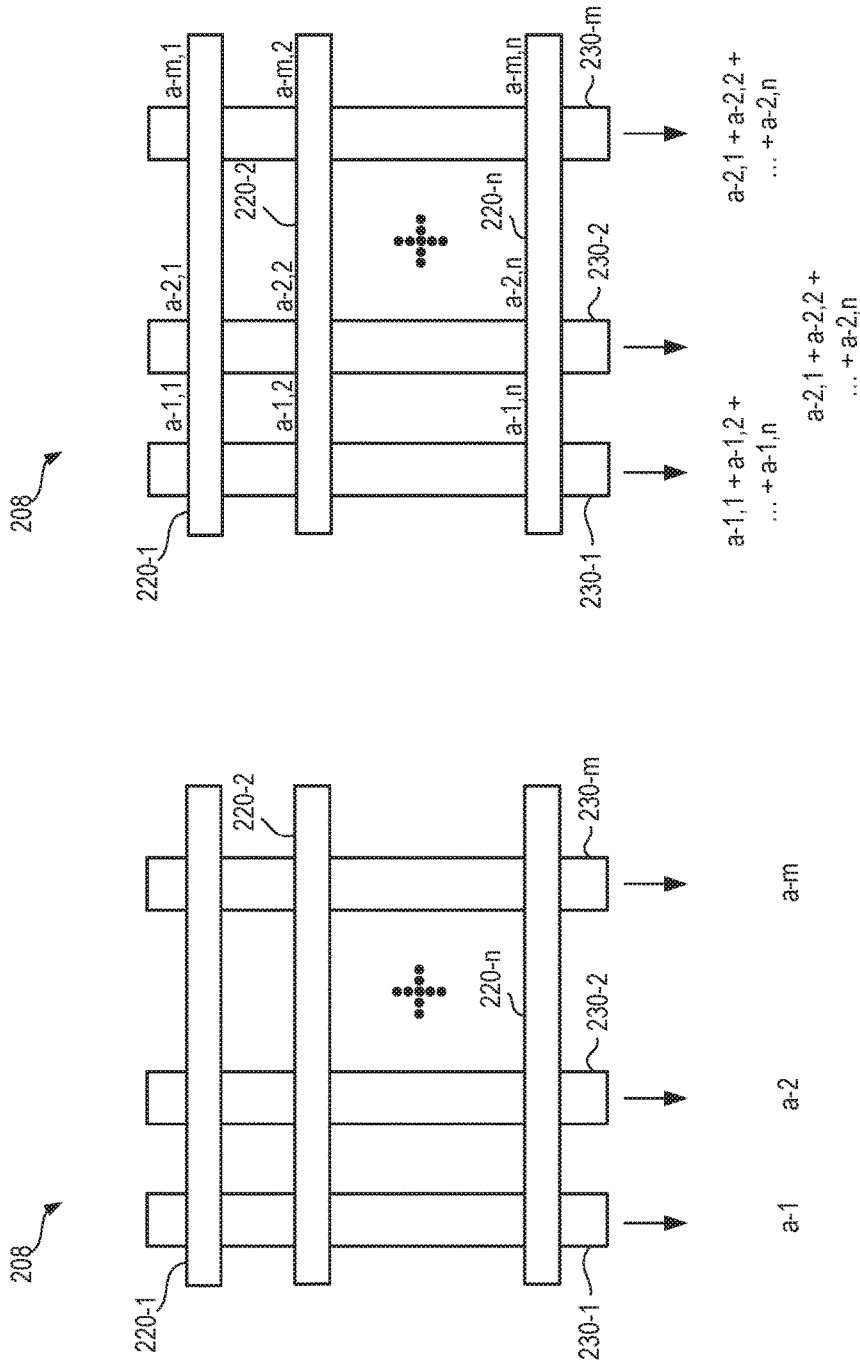

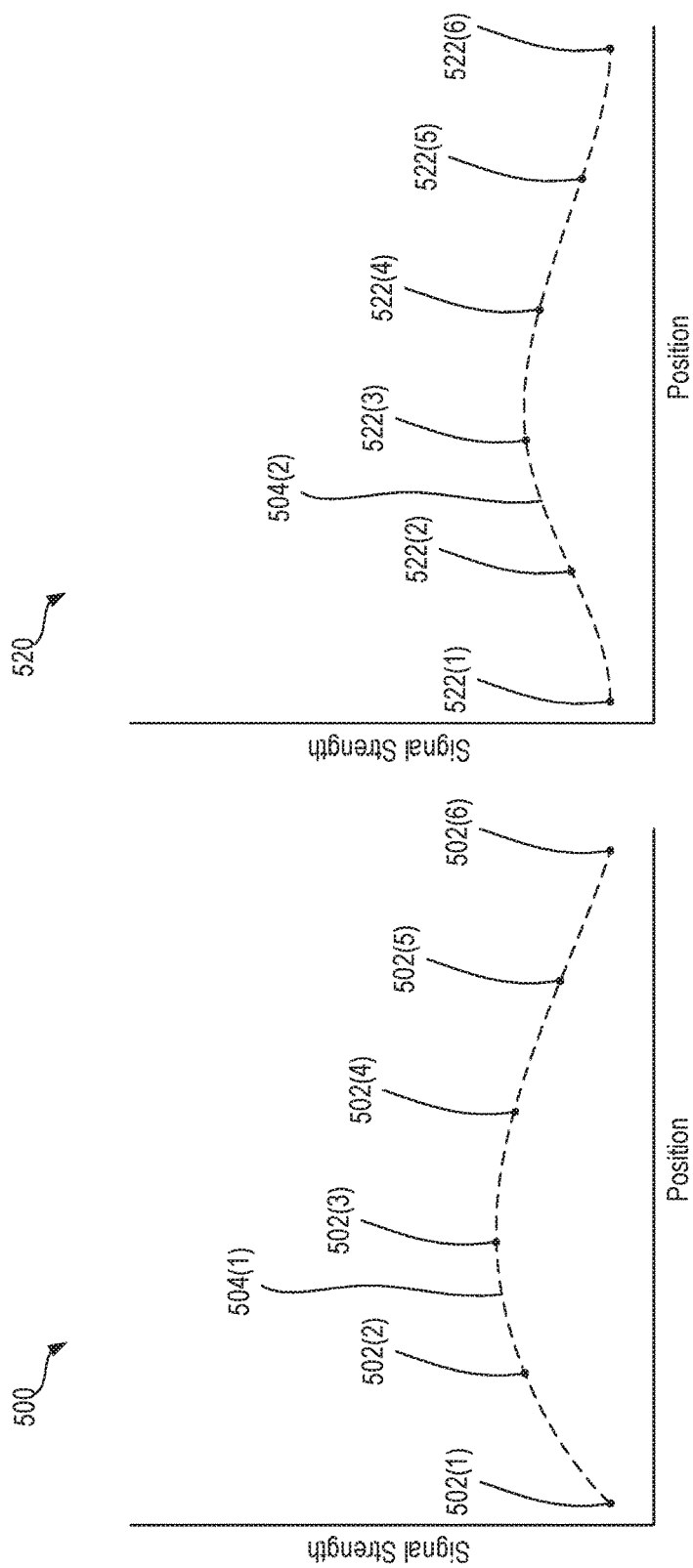

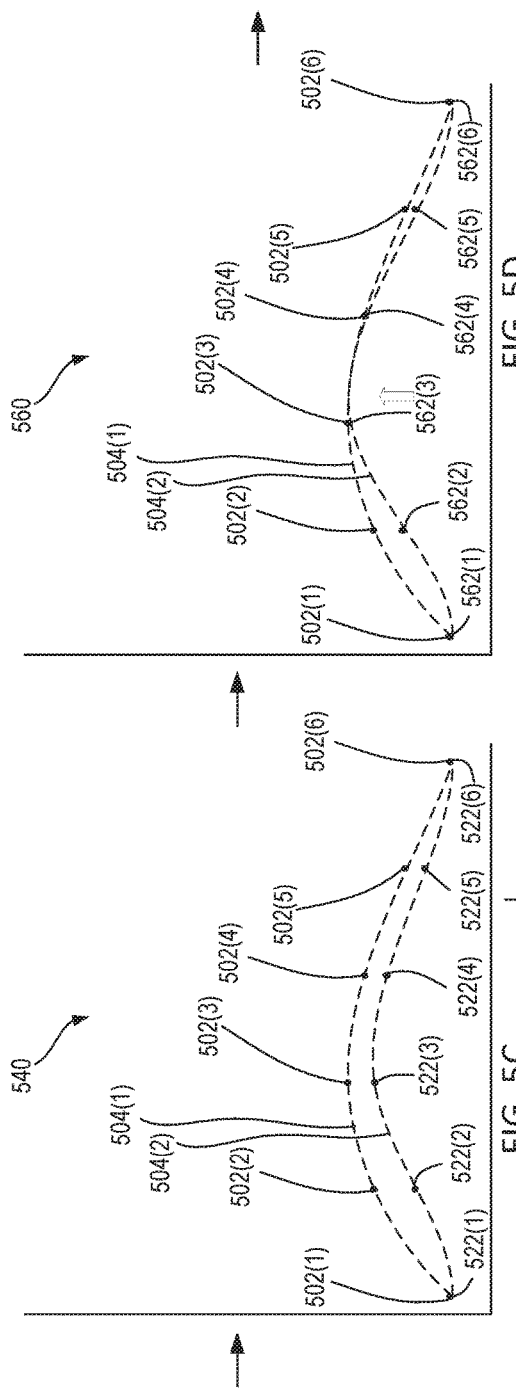
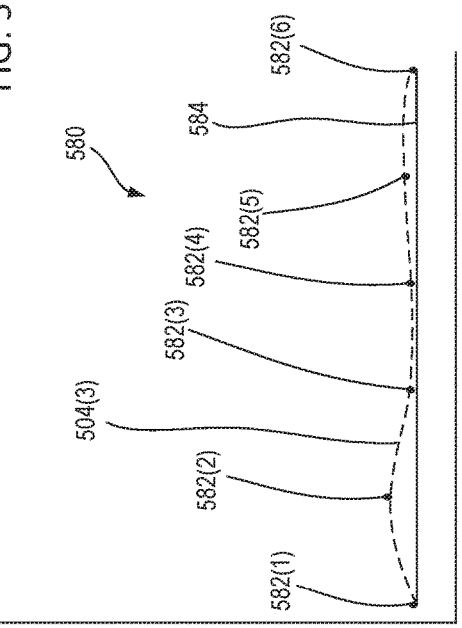

COMBINING TRANS-CAPACITANCE DATA WITH ABSOLUTE-CAPACITANCE DATA FOR TOUCH FORCE ESTIMATES

BACKGROUND

Field of the Disclosure

Embodiments generally relate to input sensing and, in particular, to combining trans-capacitance data with absolute-capacitance data for touch force estimates.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Many proximity sensors do not have the ability to accurately measure the force applied by an input object within the sensing region.

SUMMARY

A method for obtaining force-based data associated with a touch event is provided. The method includes driving a plurality of sensor electrodes in transcapacitive mode to obtain a plurality of transcapacitive measurements. The method also includes driving the plurality of sensor electrodes in absolute capacitive mode to obtain a plurality of absolute capacitive measurements. The method further includes determining the force-based data based on differences between the plurality of transcapacitive measurements and the plurality of absolute capacitive measurements.

A processing system for obtaining force-based data associated with a touch event is also provided. The processing system includes sensing circuitry configured to drive a plurality of sensor electrodes in transcapacitive mode to obtain a plurality of transcapacitive measurements and to drive the plurality of sensor electrodes in absolute capacitive mode to obtain a plurality of absolute capacitive measurements. The processing system also includes a determination processor that is configured to determine the force-based data based on differences between the plurality of transcapacitive measurements and the plurality of absolute capacitive measurements.

An input device for obtaining force-based data associated with a touch event is also provided. The input device includes a plurality of sensor electrodes and a processing system. The processing system includes sensing circuitry configured to drive a plurality of sensor electrodes in transcapacitive mode to obtain a plurality of transcapacitive measurements and to drive the plurality of sensor electrodes in absolute capacitive mode to obtain a plurality of absolute capacitive measurements. The processing system also includes a determination processor that is configured to determine the force-based data based on differences between the plurality of transcapacitive measurements and the plurality of absolute capacitive measurements.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

FIGS. 4A and 4B are block diagrams that illustrate the manner in which profiles are obtained from transcapacitive and absolute capacitive sensing, according to an example.

FIGS. 5A-5E illustrate techniques for scaling composite transcapacitive sensing measurements and generating force-related data, according to an example.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for obtaining force-related data. An input device obtains capacitive measurements in absolute capacitive mode and transcapacitive mode. The input device sums transcapacitive measurements aligned in the same dimension to generate a profile and performs a transform on the profile to generate a scaled transcapacitive profile. The input device then subtracts the scaled transcapacitive profile from the absolute capacitive measurements to obtain force-related data.

Figure 1:
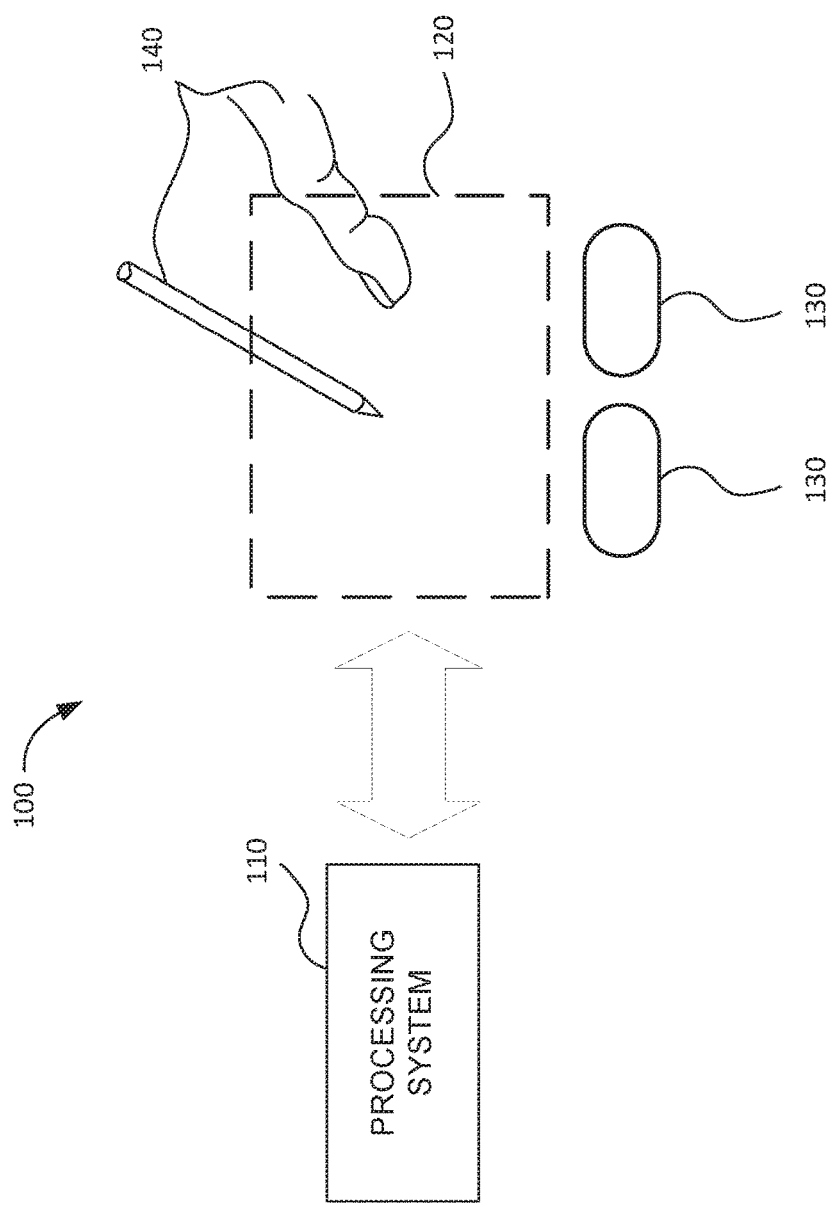
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
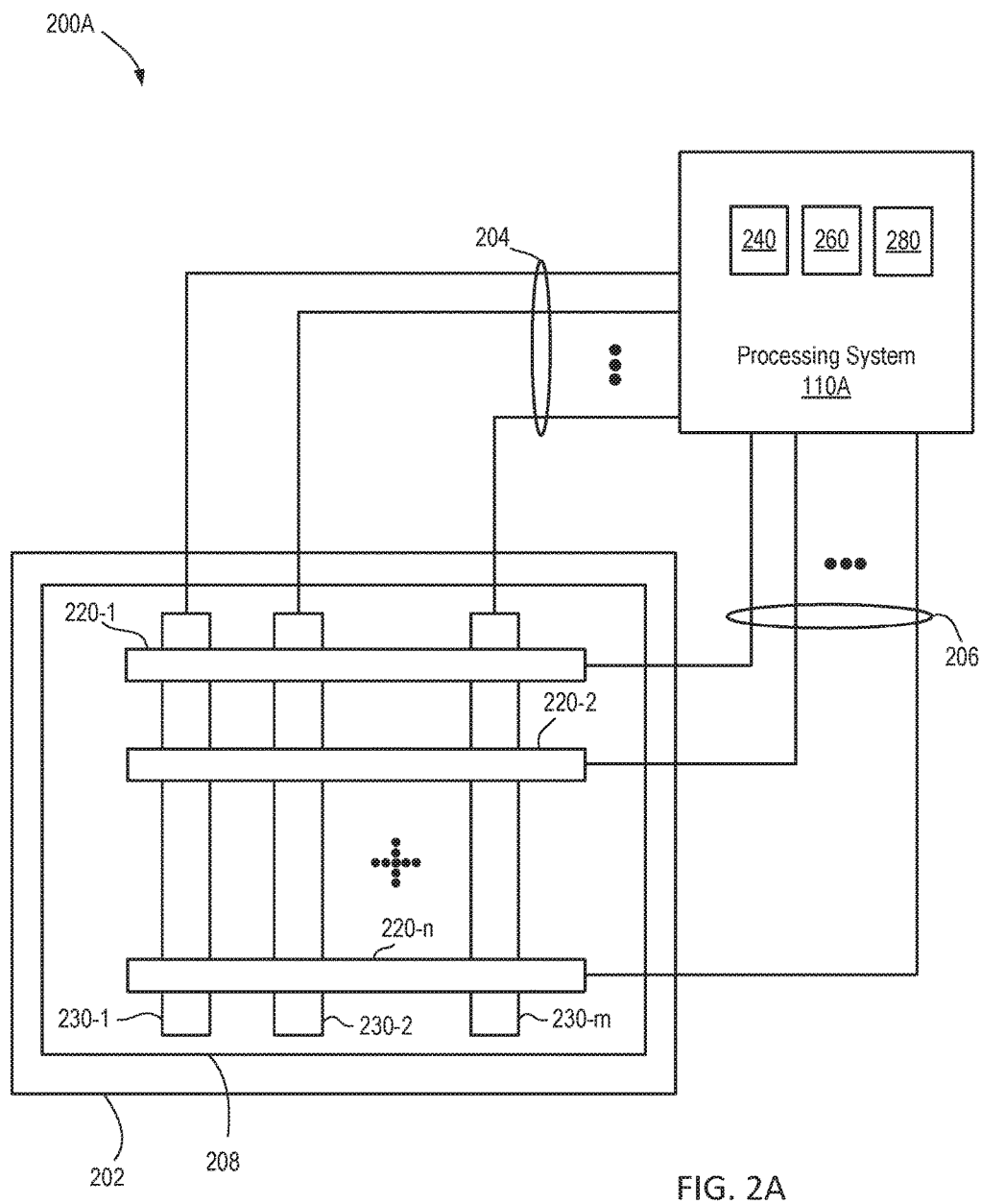
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.). Note that in some embodiments, unless otherwise stated, processing system 110B performs the same functionality as processing system 110A.

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be driven as transmitter electrodes and sensor electrodes 230 may be operated as receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
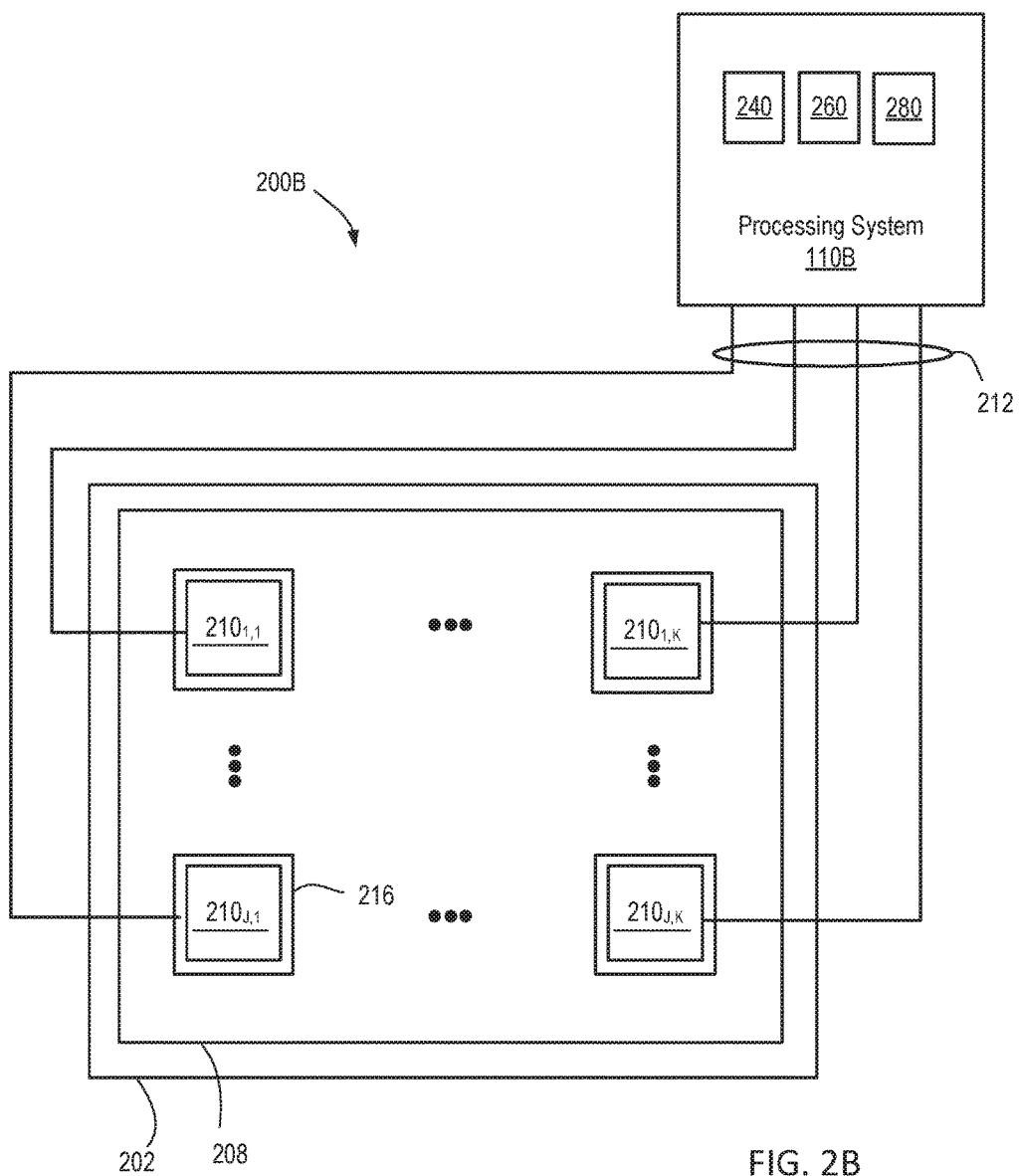
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110B can operate the sensor electrodes 210 according to a plurality of excitation schemes, including excitation scheme(s) for transcapacitive sensing and/or absolute capacitive sensing.

In some examples, the sensor electrodes 210 can be disposed on separate layers of the substrate 202. In other examples, the sensor electrodes 210 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The processing system 110B is coupled to the sensor electrodes 210 through the conductive routing traces 212 to implement the sensing region 120 for sensing inputs. In one or more embodiments, sensor electrode collection 208 may further comprise one or more grid electrodes that are disposed between sensor electrodes 210. The grid electrode(s) may at least partially encompass one or more of the sensor electrodes 210.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110 (note, processing system 110 may refer to either or 110A or 110B) excites or drives sensing elements of the sensor electrode collection 208 with a sensing signal and measures an induced or resulting signal that includes effects corresponding to at least one of the sensing signal, an input object, and interference in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives one or more sensor electrodes of the sensor electrode collection 208 with a voltage and senses resulting respective charge on the sensor electrode(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives one or more sensor electrodes of the sensor electrode collection 208 with charge and senses resulting respective voltage on sensor electrode(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor circuitry 240. The sensor circuitry 240 performs sensing-related functions of the processing system 110, such as driving sensor electrodes with signals for sensing, receiving signals from sensor electrode for processing, and other functions. The sensor circuitry 240 may be part of a sensor module that includes firmware, software, or a combination thereof operating in cooperation with the circuitry.

In some embodiments processing system 110 includes a determination module 260. The determination module 260 may be embodied as, or may include, a determination processor that is configured to perform some or all of the operations described as being performed by the determination module 260 herein, such as analyzing signals received via sensor circuitry 240 to determine presence of an input object. In some embodiments, the determination processor is a microprocessor, microcontroller, or other instruction processing electronic element that executes instructions, in the form of software or firmware, for performing such operations. In other embodiments, the determination processor is an application specific integrated circuit having circuit elements selected and arranged to perform the described operations. Note that in various embodiments, the determination processor is included within the same integrated circuit as some or all of the other portions of the processing system 110.

Note that functionality performed by sensor circuitry 240 and determination module 260 may be considered to be performed by processing system 110. Note also that although both sensor circuitry 240 and determination module 260 are described, and that specific functionality are ascribed to these elements, in various embodiments, functionality may be split amongst the sensor circuitry 240 and determination module 260 in different ways.

The sensor circuitry 240 selectively drives sensing signal(s) on one or more sensing elements of the sensor electrode collection 208 over one or more cycles ("excitation cycles") in accordance with one or more schemes ("excitation schemes"). During each excitation cycle, the sensor circuitry 240 can selectively sense resulting signal(s) from one or more sensing elements of the sensor electrode collection 208. Each excitation cycle has an associated time period during which sensing signals are driven and resulting signals measured.

In one type of excitation scheme, the sensor circuitry 240 can selectively drive sensing elements of the sensor electrode collection 208 for absolute capacitive sensing. In absolute capacitive sensing, the sensor circuitry 240 drives selected sensor electrode(s) with an absolute sensing signal and senses resulting signal(s) from the selected sensor electrode(s). In such an excitation scheme, measurements of absolute capacitance between the selected sensing element(s) and input object(s) are determined from the resulting signal(s). In an example, the sensor circuitry 240 can drive selected sensor electrodes 220, and/or selected sensor electrodes 230, with an absolute sensing signal. In another example, the sensor circuitry 240 can drive selected sensor electrodes 210 with an absolute sensing signal.

In another type of excitation scheme, the sensor circuitry 240 can selectively drive sensing elements of the sensor electrode collection 208 for transcapacitive sensing. In transcapacitive sensing, the sensor circuitry 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor circuitry 240 can drive the sensor electrodes 230 with transmitter signal(s) and receive resulting signals on the sensor electrodes 220. In another example, the sensor circuitry 240 can drive selected sensor electrodes 210 with transmitter signal(s), and receive resulting signals from others of the sensor electrodes 210.

In any excitation cycle, the sensor circuitry 240 can drive sensing elements of the sensor electrode collection 208 with other signals, such as shielding or shield signals. A shield signal may be any substantially constant voltage signal or a varying voltage signal. The sensor electrodes of sensor electrode collection 208 that are not driven with a sensing signal, or sensed to receive resulting signals, can be driven with a shield signal or left floating (i.e., not driven with any signal). The shield signal may be a ground signal (e.g., system ground) of the input device. A shield signal comprising a varying voltage signal may also be referred to as a guard signal. Such a signal can be a signal that is similar or the same in at least one of shape, amplitude, frequency, or phase of a transmitter signal or the absolute capacitive sensing signal.

"System ground" may indicate any reference voltage of the input device 100. For example, a capacitive sensing system of a mobile device can, at times, be referenced to a system ground provided by the phone's power source (e.g., a charger or battery). The system ground may not be fixed relative to earth or any other reference. For example, a mobile device on a table usually has a floating system ground. A mobile device being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor circuitry 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor circuitry 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

Processing system 110A and processing system 110B also include a display driver 280 that drives display elements of input device 100 for display updates. In various embodiments, display driver 280 may drive gate lines and source lines, where gate lines select a row of display elements for display updating and source lines provide display update values to particular sub-pixel elements. In the description below, any portion (including all) of functionality related to display updating described as being performed by the processing system 110 may be considered to be performed by the display driver 280. Display driver 280 may be embodied as, or may include, a processing system configured to perform functionality described herein, by, for example, executing software or firmware instructions. Display driver 280 may alternatively or additionally include other non-processor hardware components configured to perform functionality described herein.

In addition to determining presence and location of input objects 140 via techniques described above, processing system 110 is also capable of obtaining force-related data for input objects 140, from capacitive sensing data obtained via sensor electrodes. The force-related data includes data that is related to the amount of force that is applied by an input object 140 to the input device 100. Techniques for determining force-related data are described in detail below.

Figure 3:
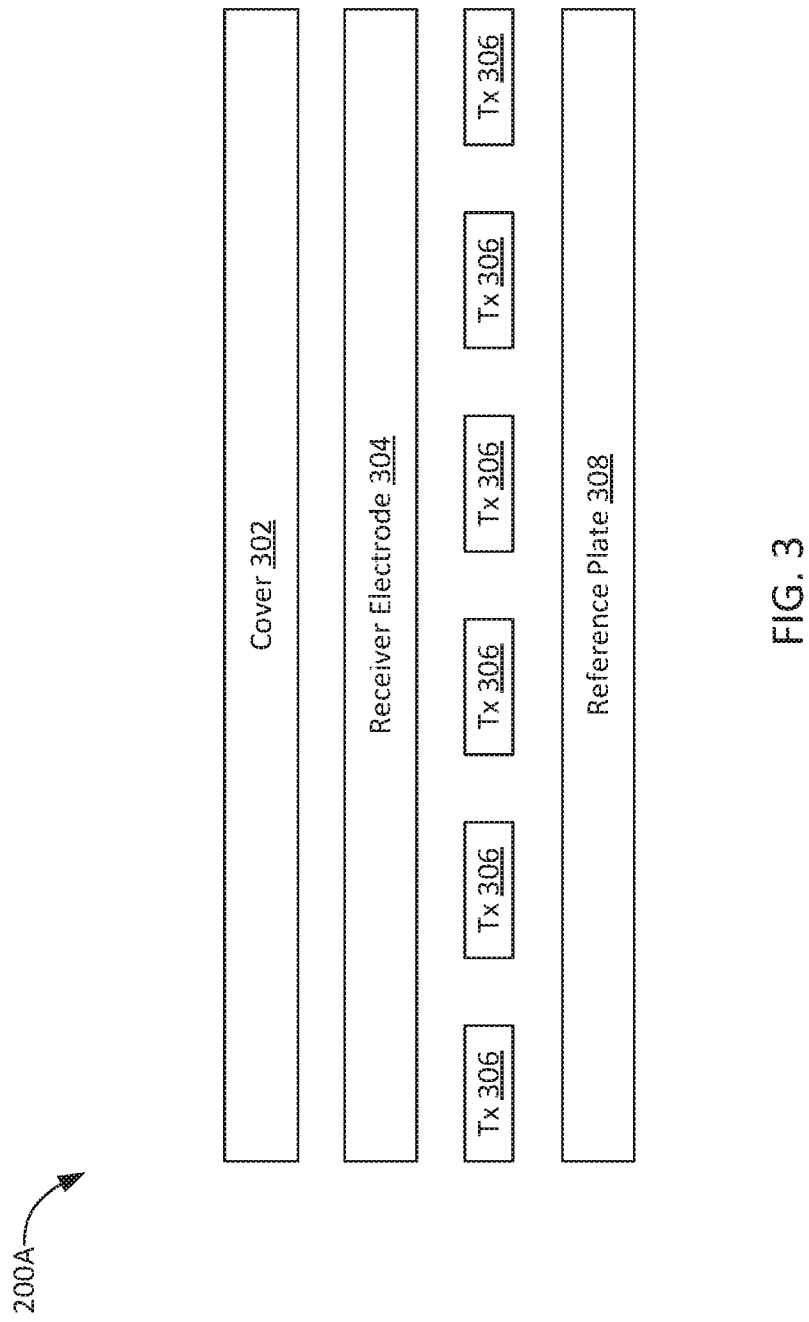
FIG. 3 is a side view of a portion of the capacitive sensor device of FIG. 2A, according to an example.

FIG. 3 is a side view of a portion of capacitive sensor device 200A of FIG. 2A, according to an example. As shown, the capacitive sensor device 200A includes a cover 302, a receiver electrode 304, transmitter electrodes 306, and a reference plate 308. The cover 302 is a protective element that prevents damage to sensor electrodes or other elements in the input device 100 from external objects such as an input object 140. The cover 302 may be an outermost element of the input device 100 that comes into contact with input objects 140. Receiver electrodes 304 may be one of sensor electrodes 220 or sensor electrodes 230 in FIG. 2A and transmitter electrodes 306 ("tx") may be the other of sensor electrodes 220 or sensor electrodes 230. Transmitter electrodes 306 are substantially perpendicular to receiver electrodes 304 and are disposed in a different layer than receiver electrodes 304. Because receiver electrodes 304 are substantially perpendicular to transmitter electrodes 306, only a single length-wise edge of a receiver electrode 304 is shown in FIG. 3, while multiple head-on transmitter electrodes 306 are shown in FIG. 3. The reference plate 308 is driven with a voltage signal that is different than the voltage signal with which transmitter electrodes 306 are driven during absolute capacitive sensing. The reference plate 308 may be held to a constant voltage, and provides functions such as shielding one side of the sensor electrodes. In some embodiments, the reference plate 308 is part of the display elements of the input device 100. In other embodiments, the reference plate 308 may be external to the display elements of the input device 100. In some embodiments, the reference plate 308 is part of a housing of the input device 100. In any of the above embodiments, the reference plate 308 may be comprised of one conductor or may be comprised of multiple different conductors.

When an input object 140 contacts cover 302, cover 302, and thus other elements in input device 100, including receiver electrodes 304 and transmitter electrodes 306, may deform towards the reference plate 308. In absolute sensing mode, in which transmitter electrodes 306 are driven with a signal and an "absolute capacitance" (i.e., capacitance to the "environment") is detected, this deformation modifies the capacitance of the transmitter electrodes 306, because the transmitter electrode 306 is brought closer to the reference plate 308. However, in transcapacitive sensing mode, in which one or more transmitter electrodes 306 may be sequentially driven and resulting signals are received with receiver electrodes 304, transmitter electrodes 306 that are not driven for sensing are driven to a reference voltage, such as ground voltage, and thus shield the receiver electrodes 304 from receiving effects due to deformation of the transmitter electrode 306. In some embodiments, in transcapacitive sensing mode, multiple transmitter electrodes 306 may be driven simultaneously. In some embodiments, in absolute capacitive mode, multiple transmitter electrodes 306 may be sensed with simultaneously. Additionally, the signal driven on transmitter electrodes 306 may be used for both transcapacitive sensing and absolute capacitive sensing.

For the above reasons, data that reflects the force applied by an input object 140 to input device 100 (e.g., to the cover 302) can be obtained by subtracting measurements performed in transcapacitive mode from measurements performed in absolute capacitive mode. Processing system 110 obtains transcapacitive measurements and absolute capacitive measurements during the same "touch event," i.e., during the same event in which an input object 140 touches the input device 100. In some embodiments, processing system 110 obtains transcapacitive measurements and absolute capacitive measurements close in time to each other, such as within a particular threshold of time during which the input object 140 does not move to a large degree. In some embodiments, processing system 110 obtains transcapacitive measurements at the same time as obtaining absolute capacitive measurements. The actual measurements obtained in transcapacitive mode are not necessarily "compatible" with the measurements obtained in absolute capacitive mode. Processing system 110 thus transforms the transcapacitive mode data by assembling the transcapacitive mode data to generate a transcapacitive profile and also by applying scaling to the transcapacitive profile. Processing system 110 then subtracts the scaled transcapacitive profile from an absolute capacitive profile that includes the absolute capacitive measurements. The term "profile" as used herein refers to a sequence of measurements, where each measurement corresponds to a different location (and sensor electrode) in the input device 100.

In some embodiments, the elements illustrated in FIG. 3 may be part of an input device comprising a display device with an integrated capacitive sensing device. In various embodiments, one or more sensor electrodes comprise at least one display electrode of the display device. For example, in one embodiment, each of the transmitter electrodes comprises one or more segments of a segmented common electrode disposed on a first layer within the display device while the receiver electrodes may be disposed on a second layer. The second layer may be within the display device or external to the display device. In one or more embodiments, the liquid crystal material is disposed between the transmitter electrodes and the receiver electrodes. In other embodiments, both the transmitter electrodes and receiver electrodes may be comprised of display electrodes and disposed on a common layer within the display or separate layers. Further, in some embodiments, the transmitter and receiver electrodes may be discrete electrodes, such that the transmitter and receiver electrodes are not comprised of display electrodes.

FIGS. 4A and 4B are block diagrams that illustrate the sensor electrode pattern 208 of FIG. 2A, and the manner in which profiles are obtained from transcapacitive and absolute capacitive sensing, according to an example. FIG. 4A illustrates the sensor electrode collection 208 of FIG. 2A driven in absolute capacitive mode and FIG. 4B illustrates the sensor electrode collection 208 driven in transcapacitive mode.

In FIG. 4A, the processing system 110 drives each of the vertical sensor electrodes 230 (which corresponds to a transmitter electrode 306 in FIG. 3) to obtain an absolute capacitive sensor measurement. The absolute capacitive sensor measurement for each vertical sensor electrode 230 is indicated as "a-x" where "x" uniquely identifies a particular sensor electrode 230. The absolute sensing profile includes a plurality of such measurements, corresponding to a plurality of different vertical sensor electrodes 230. For example, an absolute sensing profile may include measurements from a-1 to a-x.

In FIG. 4B, the processing system 110 obtains transcapacitive sensor measurements. Specifically, the processing system 110 drives transmitter electrodes (vertical sensor electrodes 230) with a signal and receives resulting signals with receiver electrodes (horizontal sensing electrodes 220). The processing system 110 obtains one measurement for each intersection point between the transmitter electrodes 230 and the receiver electrodes 220. The different measurements obtained are shown in FIG. 4B in the format "a-x, y" where x uniquely identifies a transmitter electrode 230 and y uniquely identifies a receiver electrode 220.

Once processing system 110 obtains absolute capacitive measurements, as shown in FIG. 4A, and transcapacitive measurements, as shown in FIG. 4B, processing system 110 collapses the transcapacitive measurements into a profile so that processing system 110 can subtract the transcapacitive data from absolute capacitive data to obtain bending-related data.

Collapsing the transcapacitive measurements includes generating a profile out of the transcapacitive measurements. As shown in FIG. 4A, measurements from the vertical sensor electrodes 230 include one measurement for each of the vertical sensor electrodes 230. By contrast, as shown in FIG. 4B, the transcapacitive measurements include measurements for each intersection between vertical electrodes 230 and horizontal electrodes 220. Because there are many more transcapacitive measurements, processing system 110 collapses the transcapacitive measurements by, for each vertical electrode 230, adding each measurement obtained for that vertical electrode 230 together, to obtain a composite measurement. A combination of composite measurements comprises a profile for the transcapacitive data, which is analogous to the profile for the absolute capacitive data.

Measurements obtained via transcapacitive sensing are not necessarily on the same scale as measurements obtained via absolute sensing. For example, a maximum measurement taken in absolute capacitive mode may be of a substantially different magnitude than a maximum measurement taken in transcapacitive sensing mode. FIGS. 5A-5E illustrate techniques for scaling composite transcapacitive sensing measurements, and generating a profile of force-related data, according to an example.

FIG. 5A is a graph 500 that illustrates sensing results for absolute capacitive sensing in the sensor electrode collection 208 of FIG. 2A, according to an example. As shown, a graph 500 of sensor electrode position (x-axis) vs signal strength (y-axis) includes a plot 504(1) of measurements 502. Note that plot 504(1), itself is shown only for illustrative purposes—the measurements 502 are what is actually obtained by processing system 110.

In plot 504(1), a maximal measurement 502 is measurement 502(3), which is obtained with an electrode proximate to an input object 140. Other measurements 502 have lower signal strengths that include contributions from the input object 140, bending, or both.

FIG. 5B is a graph 520 that illustrates a profile generated by collapsing measurements for transcapacitive sensing in the sensor electrode collection 208 of FIG. 2A, according to an example. As shown, a graph 520, which is also of sensor electrode position (x-axis) vs signal strength (y-axis), includes a plot 504(2) of collapsed measurements 522. In plot 504(2), a maximal measurement 522(3) is received with a sensor electrode near an input object 140. Other collapsed measurements 522 are based on measurements received with sensor electrodes in different locations. Collapsed measurements 522 received in transcapacitive mode include effects from the input object 140 but include substantially no effects from bending due to the shielding effects described with respect to FIG. 3.

FIG. 5C is a graph 540 that illustrates the absolute sensing graph 504(1) of FIG. 5A superimposed with the transcapacitive sensing graph 504(2) of FIG. 5B, according to an example. This superimposition shows the relative magnitudes of the strengths of graph 504(1) and graph 504(2). The highest magnitude measurement 522(3) for graph 504(2) is not equal to the highest magnitude measurement 502(3) for graph 504(1).

Thus, processing system 110 scales the collapsed transcapacitive measurements 504 in order to perform subtraction operations on the measurements. In some embodiments, processing system 110 scales the collapsed transcapacitive measurements by determining the ratio between the maximum collapsed transcapacitive measurement and the maximum absolute capacitive measurement and applying that ratio to each of the other transcapacitive measurement. In some embodiments, processing system 110 applies a fixed scaling factor or a dynamically varying scaling factor to the collapsed transcapacitive measurements. In some embodiments, processing system 110 determines the grounding state of the input device 100, where "grounding state" refers to the degree to which the input device is grounded 100. More specifically, if the input device 100 is not connected to land-based power, then the input device 100 may experience low ground mass, leading to different voltages than if the input device 100 were connected to land-based power. For these reasons, the processing system 110 scales the collapsed transcapacitive measurements differently based on whether the input device 100 is connected to land-based power or not.

FIG. 5D is a graph 560 that illustrates scaled measurements 562 corresponding to transcapacitive sensing graph 504(2), superimposed with absolute sensing graph 504(1), according to an example. This superimposition illustrates differences in individual measurements that correspond to the force-related data that is to be extracted via the subtraction operations.

FIG. 5E is a graph 580 that illustrates force-based data derived from absolute capacitive and transcapacitive data discussed above, according to an example. As shown, a force-data plot 504(3) is defined by force-based data points 582. Processing system 110 obtains force-based data points 582 by subtracting the scaled transcapacitive measurements 562 from the absolute capacitive measurements 504. More specifically, processing system 110 subtracts a scaled composite transcapacitive measurement for a particular vertical electrode generated as described with respect to FIG. 4B from an absolute capacitive measurement obtained from the same vertical electrode. Because force-based data is substantially not present in the composite transcapacitive measurement, but is present in the absolute data, the result of the subtraction is force-based data. Processing system 110 performs this subtraction for a plurality of vertical sensor electrodes in the sensing electrode pattern 208.

In some embodiments, once processing system 110 obtains the force-based data in a format illustrated in FIG. 5E, processing system 110 calculates a force metric. In some embodiments, the force metric is a scalar value that varies as force applied by an input object 140 to the input device 100 varies. In some embodiments, techniques for calculating a force metric based on force-based data include histogram-based techniques In some embodiments, those techniques involve deriving a force metric based on sensing data arranged into a histogram. As is generally known, a histogram comprises a set of bins, each bin being defined by a range of measurements that falls within to that bin. Each bin has an associated count number that identifies the number of measurements that fall within that bin. For force-based data as illustrated in FIG. 5E, each measurement 582 would be placed into a bin. The bins are defined based on a pre-tuned map, which is pre-calculated (or pre-determined in another manner). Pre-tuned maps may vary based on location of the finger. Thus, processing system 110 determines a location of a finger and looks up a pre-tuned map based on the location of the finger, and then places measurements into bins based on the pre-tuned map. Once the measurements are placed in the bins, processing system 110 calculates a force metric based on the counts in the bins, where the calculation is performed based on a pre-defined function that correlates bin counts with force metrics.

Although discussed herein in the context of the collection of sensor electrodes of FIG. 2A, techniques shown herein may be used in the collection of sensor electrodes shown in FIG. 2B, which are arranged in a matrix. More specifically, processing system 110 may drive sensor electrodes 210 in both absolute sensing mode and transcapacitive sensing mode, build profiles from the absolute and transcapacitive data, and subtract the transcapacitive profile from the absolute profile to obtain force-related data. The sensor electrodes arranged in a matrix, as shown in FIG. 2B, may be operated to detect changes in transcapacitance by driving at least one of the sensor electrodes with a transmitter signal while receiving with one or more other sensor electrodes. In one embodiment, at least one sensor electrode may be driven as a transmitter electrode during a first period and operated as a receiver electrode during a first period. While operating in transcapacitive sensing mode, the sensor electrodes may be selectively operated to generate profiles along one or more axes. To determine changes in absolute capacitance, one or more sensor electrodes may be modulated with absolute sensing signals while resulting signals are received on the same one or more sensor electrodes. In various embodiments, the sensor electrodes may be operated in groups to generate absolute capacitive profiles along an axis. Further, in other embodiments, the absolute capacitance from each sensor electrode may be determined and profiles may be generated within the processing system 110.

Figure 6:
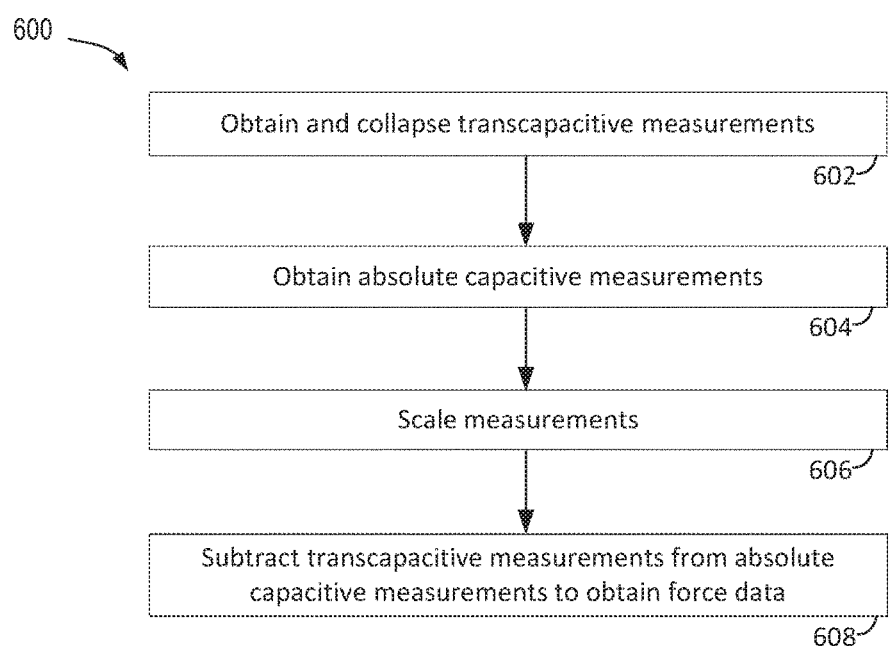
FIG. 6 illustrates a method for estimating force applied by an input object, according to an example.

FIG. 6 illustrates a method 600 for estimating force applied by an input object 140, according to an example.

Although described with respect to the system of FIGS. 1-3, those of skill in the art will recognize that the method 600, performed in the context of any system capable of performing the method 600, and in various technically feasible alternative orders, falls within the scope of the present disclosure.

As shown, the method 600 begins at step 602, where the processing system 110 drives sensor electrodes to obtain transcapacitive measurements. The processing system 110 also transforms the transcapacitive measurements by collapsing the transcapacitive measurements into a profile to match the format of absolute capacitive measurements and also by scaling the collapsed transcapacitive measurements. Collapsing the transcapacitive measurements includes adding each of the measurements that fall along a particular axis corresponding to each particular sensor electrode to form a composite transcapacitive measurement for the respective electrode.

At step 604, the processing system 110 obtains absolute capacitive measurements by driving transmitter electrodes and receiving signals with such electrodes. At step 606, the processing system 110 scales the transcapacitive measurements according to techniques described herein.

At step 608, the processing system 110 subtracts the scaled, transformed transcapacitive data from the absolute capacitive data to obtain force-related data. More specifically, for a plurality of measurements of absolute capacitive sensing data (which corresponds to a particular sensor electrode), the processing system 110 subtracts the composite transcapacitive sensing measurement from the sensor electrode associated with the absolute capacitive measurement to obtain a difference. The result is a plurality of differential values that comprise force-based data.

After the processing system 110 performs the method 600 obtains the force-based data, the processing system 110 may obtain a force metric. As described above, the force metric is a scalar value that is derived from the force-based data. In some embodiments, the processing system 110 obtains the force metric using a histogram-based technique, as described above.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

What is claimed is:

1. A method for obtaining force-based data associated with a touch event, the method comprising:
driving a plurality of sensor electrodes in transcapacitive mode to obtain a plurality of transcapacitive measurements;
driving the plurality of sensor electrodes in absolute capacitive mode to obtain a plurality of absolute capacitive measurements; and
determining the force-based data based on differences between the plurality of transcapacitive measurements and the plurality of absolute capacitive measurements.

2. The method of claim 1, wherein:
the plurality of sensor electrodes comprises at least one display electrode, wherein the display electrode is configured for both display updating and capacitive sensing.

3. The method of claim 1, wherein during a touch event, an input object causes at least one sensor electrode of the plurality of sensor electrodes to move closer to a conductor within an input device that includes the plurality of sensor electrodes.

4. The method of claim 1, wherein determining the force-based data comprises:
collapsing the plurality of transcapacitive measurements to obtain a plurality of composite transcapacitive measurements.

5. The method of claim 4, wherein collapsing the plurality of transcapacitive measurements comprises:
combining transcapacitive measurements of the plurality of transcapacitive measurements, each such transcapacitive measurement corresponding to the same sensor electrode, to form a composite transcapacitive measurement of the plurality of composite transcapacitive measurements.

6. The method of claim 4, further comprising:
scaling the plurality of composite transcapacitive measurements to obtain a plurality of scaled composite transcapacitive measurements.

7. The method of claim 6, wherein determining the force-based data comprises:
subtracting the scaled composite transcapacitive measurements from the plurality of absolute capacitive measurements to obtain the force-based data.

8. A processing system for obtaining force-based data associated with a touch event, the processing system comprising:
sensing circuitry configured to:
drive a plurality of sensor electrodes in transcapacitive mode to obtain a plurality of transcapacitive measurements, and
drive the plurality of sensor electrodes in absolute capacitive mode to obtain a plurality of absolute capacitive measurements; and
a determination processor configured to:
determine the force-based data based on differences between the plurality of transcapacitive measurements and the plurality of absolute capacitive measurements.

9. The processing system of claim 8, wherein:
the plurality of sensor electrodes comprises at least one display electrode, wherein the display electrode is configured for both display updating and capacitive sensing.

10. The processing system of claim 8, wherein during a touch event, at least one sensor electrode of the plurality of sensor electrodes is configured to move closer to a conductor within an input device that includes the plurality of sensor electrodes in response to touch applied by an input object.

11. The processing system of claim 8, wherein the determination processor is configured to determine the force-based data by:
   collapsing the plurality of transcapacitive measurements to obtain a plurality of composite transcapacitive measurements.

12. The processing system of claim 11, wherein the determination processor is configured to collapse the plurality of transcapacitive measurements by:
   combining transcapacitive measurements of the plurality of transcapacitive measurements, each such transcapacitive measurement corresponding to the same sensor electrode, to form a composite transcapacitive measurement of the plurality of composite transcapacitive measurements.

13. The processing system of claim 11, wherein the determination processor is further configured to:
   scale the plurality of composite transcapacitive measurements to obtain a plurality of scaled composite transcapacitive measurements.

14. The processing system of claim 13, wherein the determination processor is configured to determine the force-based data by:
   subtracting the scaled composite transcapacitive measurements from the plurality of absolute capacitive measurements to obtain the force-based data.

15. An input device for obtaining force-based data associated with a touch event, the input device comprising:
   a plurality of sensor electrodes; and
   a processing system comprising:
   sensing circuitry configured to:
   drive a plurality of sensor electrodes in transcapacitive mode to obtain a plurality of transcapacitive measurements, and
   drive the plurality of sensor electrodes in absolute capacitive mode to obtain a plurality of absolute capacitive measurements; and
   a determination processor configured to:
   determine the force-based data based on differences between the plurality of transcapacitive measurements and the plurality of absolute capacitive measurements.

16. The input device of claim 15, wherein:
   the plurality of sensor electrodes comprises at least one display electrode, wherein the display electrode is configured for both display updating and capacitive sensing.

17. The input device of claim 15, wherein during a touch event, at least one sensor electrode of the plurality of sensor electrodes is configured to move closer to a conductor within an input device that includes the plurality of sensor electrodes in response to touch applied by an input object.

18. The input device of claim 15, wherein the determination processor is configured to determine the force-based data by:
   collapsing the plurality of transcapacitive measurements to obtain a plurality of composite transcapacitive measurements.

19. The input device of claim 18, wherein the determination processor is configured to collapse the plurality of transcapacitive measurements by:
   combining transcapacitive measurements of the plurality of transcapacitive measurements, each such transcapacitive measurement corresponding to the same sensor electrode, to form a composite transcapacitive measurement of the plurality of composite transcapacitive measurements.

20. The input device of claim 18, wherein the determination processor is further configured to:
   scale the plurality of composite transcapacitive measurements to obtain a plurality of scaled composite transcapacitive measurements.

* * * * *